(12) United States Patent
Terneu et al.

(10) Patent No.: US 6,416,890 B1
(45) Date of Patent: Jul. 9, 2002

(54) SOLAR CONTROL COATED GLASS

(75) Inventors: Robert Terneu, Thiméon; Eric Tixhon, Awans, both of (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 09/415,070

(22) Filed: Oct. 12, 1999

(30) Foreign Application Priority Data

Oct. 13, 1998 (GB) ............................................. 9822338

(51) Int. Cl.$^7$ ................................................. B32B 9/00
(52) U.S. Cl. ..................... 428/701; 428/702; 428/469; 428/472; 428/698; 428/697; 428/428; 428/432; 428/448; 427/585; 427/166; 427/167; 427/168; 427/255; 427/427
(58) Field of Search ................................. 428/469, 472, 428/701, 702, 699, 698, 697, 689, 428, 432, 448, 446, 220; 427/166, 167, 168, 255, 427, 585

(56) References Cited

U.S. PATENT DOCUMENTS

| | | | |
|---|---|---|---|
| 5,168,003 A | 12/1992 | Proscia | 428/216 |
| 5,256,485 A | 10/1993 | Terneu et al. | 428/426 |
| 5,324,537 A | 6/1994 | Proscia et al. | 427/109 |
| 5,385,751 A | 1/1995 | Riaz et al. | 427/126.2 |
| 6,048,621 A * | 4/2000 | Gallego et al. | |

FOREIGN PATENT DOCUMENTS

| | | | | |
|---|---|---|---|---|
| EP | 0523877 A1 | | 1/1993 | ............ C23C/16/40 |
| EP | 0735009 A1 | | 10/1996 | ............ C03C/17/34 |
| FR | 2348166 | | 11/1977 | ............ C03C/17/08 |
| FR | 2648453 | | 12/1990 | ............ C03C/17/30 |
| GB | 1455148 | | 11/1976 | ............ C01B/13/14 |
| GB | 2031756 A | * | 4/1980 | |
| GB | 2114965 A | | 9/1983 | ............ C03C/17/34 |
| WO | 98/11031 | | 3/1998 | ............ C03C/17/34 |

* cited by examiner

Primary Examiner—Deborah Jones
Assistant Examiner—Wendy Boss
(74) Attorney, Agent, or Firm—Piper Rudnick LLP; Jerold I. Schneider

(57) ABSTRACT

A solar control transparent glass sheet is provided by a soda-lime glass sheet carrying a coating of at least two pyrolytically-formed layers, characterised by the presence in the coating of a conductive or semi-conductive layer having a thickness in the range 15 to 500 nm and formed of a material comprising a metal oxide containing a dopant in an amount of from 1 to 100 moles per 100 moles of the metal oxide, the said metal oxide being selected from one or more of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$), whereby the so-coated sheet has a neutral or blue tint in transmission and in reflection, a luminous transmittance (TL) which is in the range 30 to 85% and a selectivity of greater than 1, preferably greater than 1.2.

42 Claims, No Drawings

SOLAR CONTROL COATED GLASS

BACKGROUND OF THE INVENTION

1. Field of the Invention

The present invention relates to sheets of solar control glass and to a method for their preparation.

Transparent solar control sheets are much in demand for use in exterior glazing panels for buildings. In addition to having aesthetic appeal they offer advantages in providing protection against the heating and dazzling effects of solar radiation. A similar demand exists for glass sheets used for vehicle windows.

The solar control sheets, typically of soda-lime glass, carry a coating to provide the specific properties required. They may be employed as a single sheet or in a glazing panel incorporating other sheets of glass and possibly also non-vitreous laminating materials. The solar control requirement is that the sheet, or the panel of which it forms a part, shall not pass too great a proportion of total incident solar radiation, thereby resisting overheating of the building or vehicle interior.

Properties of the coated glass sheet discussed herein are based on the standard definitions of the International Commission on Illumination—Commission Internationale de l'Eclairage ("CIE").

The "luminous transmittance" (TL) is the luminous flux transmitted through the sheet as a percentage of the incident luminous flux.

The "luminous reflectance" (RL) is the luminous flux reflected from the sheet as a percentage of the incident luminous flux. For a sheet with a coating on one face, the reflectance may be measured from the coated side (RLc) or from the uncoated glass side (RLg).

The transmission of total incident solar radiation may be expressed as the "solar factor" (FS) of the sheet, which as used herein means the sum of the total energy directly transmitted and the energy which is absorbed and re-radiated on the side away from the energy source, as a percentage of the total radiant energy incident on the sheet.

The "selectivity" of the sheet is the ratio of the luminous transmittance to the solar factor (TL/FS). glass sheet, including pyrolysis. Pyrolysis generally has the advantage of producing a hard coating with durable abrasion- and corrosion-resistant properties. This is believed to be due in particular to the glass sheet being hot during the deposition of the coating material. Pyrolysis is also generally cheaper than alternative coating processes such as sputtering, particularly in terms of the investment in plant.

A wide variety of coating materials have been proposed for modifying the optical properties of glazing panels. Tin oxide ($SnO_2$) has been widely used, often in combination with other materials such as other metal oxides.

2. Description of the Related Art

Our GB patent 1455148 is an early example of a method for pyrolytically forming a coating of one or more oxides (e.g. $SnO_2$, $Co_3O_4$, $Cr_2O_3$, $Sb_2O_3$, $SiO_2$, $TiO_2$ or $ZrO_2$) on a glass sheet, primarily by spraying compounds of a metal or silicon, so as to modify its light transmission and/or light reflection.

U.S. Pat. No. 5385751 relates to the formation of a fluorine-doped film of tungsten oxide on a glass substrate surface so as to improve the solar and optical properties of the glass. The doped oxide is obtained by reaction at the said surface of a tungsten alkoxide, an oxygen-containing compound and a fluorine-containing compound.

WO 98/11031 relates to solar control coated glass in which the coating comprises a heat-absorbing layer of a metal oxide such as chromium oxide, cobalt oxide, iron oxide, molybdenum oxide, niobium oxide, vanadium oxide or doped or undoped tungsten oxide, and a low emissivity layer of a metal compound, for example a semiconductor metal oxide such as doped tin oxide or doped indium oxide.

SUMMARY OF THE INVENTION

It is an object of the present invention to provide a pyrolytically formed coated glass sheet with significant solar screening properties.

We have discovered that this and other useful objectives can be achieved by applying to the sheet a pyrolytic coating which includes a conductive or semi-conductive layer of a defined thickness of certain metal oxides containing a conductive dopant material. (References herein to numerical limits of layer thicknesses are in all cases to geometric thicknesses.)

Thus, according to the present invention, there is provided a transparent glass sheet carrying a coating of at least two pyrolytically-formed layers, characterised by the presence in the coating of a conductive or semi-conductive layer having a thickness in the range 15 to 500 nm and formed of a material comprising a metal oxide containing a dopant in an amount of from 1 to 100 moles per 100 moles of the metal oxide, the said metal oxide being selected from one or more of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$), whereby the so-coated sheet has a neutral or blue tint in transmission and in reflection, a luminous transmittance (TL) which is in the range 30 to 85% and a selectivity of greater than 1.

The invention also provides a method of producing a transparent glass sheet carrying a coating of at least two pyrolytically-formed layers, characterised by applying to the sheet a conductive or semi-conductive layer having a thickness in the range 15 to 500 nm and formed of a material comprising a metal oxide and introducing into the said metal oxide a dopant in an amount of from 1 to 100 moles per 100 moles of the metal oxide, the said metal oxide being selected from one or more of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$), whereby the so-coated sheet has a neutral or blue tint in transmission and in reflection, a luminous transmittance (TL) which is in the range 30 to 85% and a selectivity of greater than 1.

A particular benefit of the above-defined conductive or semi-conductive layer is that it imparts to the coated sheet a greater reflection in the near infra-red than in the visible range, thereby improving the solar protection while retaining high luminous transmission.

The coating comprises a layer, generally transparent, which interferes with the conductive or semi-conductive layer so as to confer to the coated glass sheet the neutral or blue tint in transmission and in reflection.

Doped tungsten oxide is a preferred material for the conductive or semi-conductive layer. Among its useful properties is a naturally low emissivity (E) i.e. the ratio of the energy emitted by a given surface at a given temperature to that of a perfect emitter (a black body with emissivity of 1.0) at the same temperature.

The metal oxide is formed from a suitable precursor. For example, for molybdenum oxide suitable precursors include molybdenum carbonyl [$Mo(CO)_6$], molybdenum acetyl acetonate, a molybdenum chloride ($MoCl_3$ or $MoCl_5$), molybdenum fluoride ($MoF_6$), an organic molybdenum compound such as $MoO_2$(2,2,6,6-tetramethylheptane-3,5-dione)$_2$, and a molybdenum oxychloride ($MoO_2Cl_2$ or $MoOCl_4$) For vanadium oxide a suitable precursor is vanadium acetyl acetonate. For niobium oxide suitable precursors include niobium ethoxide [$Nb(OC_2H_5)_5$], niobium chloride ($NbCl_5$), niobium fluoride ($NbF_5$) and niobium dipivaloylmethanatochloride ($Nb(2,2,6,6$-tetramethylheptane-3,5-dione)$_2Cl_3$). To form tantalum oxide, suitable precursors include tantalum fluoride or chloride ($TaF_5$ or $TaCl_5$) or an alkoxy tantalum [e.g. $Ta(OR)_5$ in which $R=CH_3$, $C_2H_5$ or $C_4H_9$]. To form tungsten oxide, suitable precursors include tungsten hexachloride ($WCl_6$), tungsten oxytetrachloride (WOC14), tungsten carbonyl [$W(CO)_6$], tungsten cyclopentadienyl chloride [$W(C_5H_5)_2Cl_2$], tungsten fluoride ($WF_6$), or a tungsten ethoxide [$W(OC_2H_5)_5$ or $W(OC_2H_5)_6$].

The dopant provides the conductive properties of the conductive or semi-conductive layer. The dopant is present in the layer in an amount from 1 to 100 moles per cent moles of the metal oxide, preferably 5 to 100 moles per cent moles of the metal oxide to ensure the conductive or semi-conductive character to the metal oxide layer. Preferred dopants include hydrogen, lithium, sodium, potassium, and fluorine. For a $WO_3$-based layer, the preferred quantity of a hydrogen, lithium, sodium or potassium dopant is in the range 20 to 100 moles per 100 moles of the metal oxide, whereas for a fluorine dopant the preferred quantity is in the range 10 to 40 moles per 100 moles W. For a $MoO_3$ layer, the preferred quantity of a sodium dopant is in the range 20 to 100 moles per 100 moles Mo and the preferred quantity of a fluorine dopant is in the range 10 to 30 moles per 100 moles Mo. For a $Nb_2O_3$ or $Ta_2O_5$ layer, the preferred quantity of a fluorine dopant is in the range 1 to 5 per 100 moles Nb or Ta.

The dopant can be applied after formation of the metal oxide and allowed to diffuse into the metal oxide. In one option the metal oxide is formed within the float chamber of a flat glass production line and hydrogen to act as the dopant is provided by the hydrogen atmosphere in the said chamber.

With hydrogen, lithium, sodium or potassium dopants the layer is conductive. The layer thickness with these dopants is preferably in the range 15 to 100 nm, whereas with a fluorine dopant the layer is semi-conductive and its thickness is preferably in the range 100 to 500 nm.

In one preferred embodiment of the invention the coating includes a transparent layer as an undercoat between the glass sheet and the conductive or semi-conductive layer. Suitable materials for this undercoat layer include one or more of oxides, oxycarbides, nitrides and oxynitrides, such as $Al_2O_3$, $SiO_2$, $SiOx$ ($0<x<2$), $SnO_2$, $SnO_2$/Sb ($0.02<Sb/Sn<0.5$), $SnO_2$/F ($0.01<F<0.03$), $TiO_2$, $ZrO_2$, $SiO_xC_y$, AlN, $Si_3N_4$, $AlN_xO_y$, $SiN_xO_y$.

Preferably, the material of the undercoat is an oxide. Oxide layers can be readily produced by pyrolysis and have known, stable properties.

Preferably the material of the undercoat layer is a dielectric material. This ensures good transparency and serves to achieve the required optical properties for the coated glass sheet. The preferred materials are $SnO_2$ and $TiO_2$.

The preferred thickness for this layer is in the range 15 to 90 nm. If the coating includes just the undercoat layer and the conductive or semi-conductive layer, i.e. with no other layers, then the preferred thickness of the undercoat layer is in the range 22 to 90 nm and the preferred thickness of the conductive or semi-conductive layer is in the range 20 to 60 nm.

The undercoat layer provides several advantages. It helps to neutralise the tint of the coating in reflection. It serves to reduce the total reflection of the coating in the visible range, thereby improving the selectivity. It can provide a barrier to diffusion of sodium ions from the glass into the coating, this being especially desirable so as to prevent haze. Haze can appear with some precursors containing chlorine, especially when forming thick coating layers starting from such precursors.

In a further preferred embodiment of the invention the coating includes a transparent layer as an overcoat layer on the face of the conductive or semi-conductive layer away from the glass sheet. Such an overcoat layer can protect the conductive or semi-conductive layer when exposed to the atmosphere.

Suitable materials for the overcoat layer include one or more of oxides, nitrides and oxynitrides, such as $Al_2O_3$, $SiO_2$, $SnO_2$, $SnO_2$/Sb ($0.02<Sb/Sn<0.5$), $SnO_2$/F ($0.01<F/Sn<0.03$), $TiO_2$, $Zro_2$, $Si_3N_4$ and $SiN_xO_y$.

Preferably, the material of the overcoat is an oxide. Oxide layers can be readily produced by pyrolysis and have known, stable properties.

Preferably the material of the overcoat layer is a dielectric material. This ensure good transparency and serves to achieve the required optical properties for the coated glass sheet. The preferred materials are $SnO_2$ and $TiO_2$ in that they facilitate the protection and neutralising of the coating.

The preferred thickness for the overcoat layer is in the range 5 to 60 nm. Such a range of thickness permits the achievement of the required optical properties i.e. neutral or blue tint in transmission and in reflection. If the coating includes just the conductive or semi-conductive layer and the overcoat layer, i.e. with no other layers, then the preferred thickness of the conductive or semi-conductive layer is in the range 15 to 500 nm and the preferred thickness of the overcoat layer is in the range 10 to 60 nm.

Suitable precursors for the material used as the undercoat or overcoat layers include chlorides, for example $AlCl_3$, $SiCl_4$, $SnCl_4$ and $TiCl_4$, and organometallic compounds such as monobutyl trichloro tin ("MBTC").

The overcoat layer serves as a barrier to the diffusion of atmospheric oxygen into the coating in the case of subsequent thermal treatment or bending of the product. This layer also helps to neutralise the tint of the coating in reflection and to minimise the reflection of the finished product in the visible range. It also serves as a barrier to the diffusion of dopant from the conductive or semi-conductive layer and thus assists in preserving the conductive character of this layer.

In the most preferred embodiment of the invention the coating includes both an undercoat layer and an overcoat-layer. The material of the undercoat layer need not essentially be the same as that of the overcoat layer but use of the same material may be the most convenient in terms of manufacture of the coating. In a triple coating of undercoat layer, conductive or semi-conductive layer and overcoat layer, the preferred thicknesses of the said layers are in the ranges 15 to 60 nm, 15 to 500 nm and 5 to 60 nm respectively. The preferred materials for the undercoat and overcoat layers are transparent dielectric oxide materials.

The undercoat and overcoat layers in a triple coating as above are preferably free from dopant. This is to ensure that the coating has in sequence a non-conductive layer, a conductive or semi-conductive layer and another non-conductive layer. The interference between the respective non-conductive and conductive layers assists in achieving a combination of high luminous transmittance and low luminous reflectance in the visible spectrum.

The thicknesses of the respective layers in the coating, their refractive indices and the specific materials employed for the layers affect the optical properties of the coated sheet. The specific optimum thicknesses thus vary within the above-mentioned ranges according to the layer materials and the optical properties of the coated sheets which are sought after.

A coating according to the invention, particularly a coating comprising the conductive or semi-conductive layer and also an overcoat layer, may provide a coated sheet with the particular advantage of being well able to withstand bending and heat treatment such as tempering. This property is especially useful in the production of vehicle windows.

Coated glass sheets according to the invention have a selectivity of greater than 1, i.e. a luminous transmission (TL) greater than their solar factor (FS). The preferred selectivity is greater than 1.2.

The neutral or blue tints achieved for the sheets according to the invention are represented by Hunter values a and b in transmission of $-10<a<3$ and $-10<b<3$ and in reflection of $-10<a<3$ and $-10<b<3$).

Preferably, the Hunter value a in reflection and in transmission is lower or equal to zero so as to avoid a red component of the tint. Then the Hunter value a in transmission and in reflection is: $-10<a\leq 0$. Preferably the Hunter value a in reflection and in transmission is greater than $-6$ ($-6<a$) so that the green component of the tint is low. Most preferably the Hunter value a in reflection and in transmission is between $-6$ and $0$ ($-6<a\leq 0$), so that the green and yellow components of the tint are low.

Preferably, the Hunter value b in reflection and in transmission is between $-10<b<0$ so as to avoid a yellow component in the tint.

Producing the coatings of the invention by pyrolysis provides a greater mechanical resistance than that of coatings produced by other methods.

Application of a pyrolytic coating to flat glass is best achieved when the glass is newly formed, for example as it leaves a float glass line as a hot glass ribbon or even better within the float chamber. This provides economic benefits in avoiding the need to reheat the glass for the pyrolytic reactions to take place, and in the quality of the coating, since the newly formed glass surface is in pristine condition.

The source material for the respective coating layers may be applied to the glass sheet by chemical vapour deposition (CVD or "vapour pyrolysis"), as a liquid spray ("liquid pyrolysis") or by a combination of CVD and spray. To form the coating layers by CVD, the source material is typically supplied through a first nozzle to contact the glass sheet. If the source material comprises one or more chlorides which are liquid at ambient temperature, it is vaporised in a heated current of anhydrous carrier gas such as nitrogen. Vaporisation is facilitated by the atomization of these reagents in the carrier gas. To produce the oxides, the reactant, for example a chloride, is brought into the presence of an oxygen-containing compound, for example water vapour, acetic acid, isopropanol or ethyl acetate, which is preferably conducted through a second nozzle.

Methods and devices for forming such a coating are described for example in French patent No 2348166 or in French patent application No 2 648 453 A1. These methods and devices lead to the formation of particularly strong coatings with advantageous optical properties.

To form the coating by a spray method, the glass sheet may be brought into contact with a spray of liquid droplets containing the source material. The spray is applied by one or more spray nozzles arranged to follow a path which provides the coating across the width of the sheet or ribbon to be coated.

The preferred method of deposition for the coating layers of the invention is CVD. This offers benefits over sprayed liquids in providing coatings of regular thickness and composition, such uniformity of the coating being important where the product is to cover a large area. A spray coating also tends to retain traces of the sprayed droplets and of the path of the spray gun. Moreover, the pyrolysis of sprayed liquids is essentially limited to the manufacture of oxide coatings, such as $SnO_2$ and $TiO_2$. It is also difficult to make multi-layer coatings using sprayed liquids because every coating deposition produces a significant cooling of the glass sheet. Furthermore, CVD is more economic in terms of raw materials, leading to lower wastage.

However despite such disadvantages of the spray method it is nevertheless often adopted because of being convenient and inexpensive to apply.

A coated glass sheet according to the invention may be employed as a single-sheet glazing panel or alternatively in a multiple-glazed or laminated panel assembly. In a multiple glazing or laminated assembly it is preferred that just one of the constituent sheets carries the coating.

DESCRIPTION OF THE PREFERRED EMBODIMENTS

The invention will now be described in more detail with reference to the following non-limiting examples and accompanying table. The initials in the headings in the table (TL, RLc etc.) have the meanings described above.

COMPARATIVE EXAMPLES 1 to 4 (C1 to C4)

A ribbon of clear soda-lime float glass within the float chamber of a float glass production line was coated by CVD pyrolysis using a coating unit comprising two successive nozzles. The ribbon had a thickness of 6 mm, a temperature of about 700° C. and moved at a speed of 7 metres per minute. Tungsten fluoride ($WF_6$) gas and sodium vapour were injected into a current of anhydrous nitrogen gas as a carrier gas and fed with the carrier gas applied to the ribbon through the first nozzle, so as to introduce dopant into the metal oxide.

Acetic acid at about 250° C. was also injected into a carrier gas, in this case air heated to about 250° C., and fed through the second nozzle to react with the $WF_6$ and form a coating of $WO_3$ on the ribbon surface. This coating process was continued until a defined thickness of the $WO_3$ coating had been applied, the thickness being different for the comparative examples as shown in the accompanying table. Sodium dopant was introduced into the coating by the sodium vapour (as an alternative the sodium could have been provided from the glass itself) with a proportion of sodium relative to the $WO_3$ of 94 molar percent (i.e. 94 moles of dopant per 100 moles of $WO_3$), thereby giving a metallic conductive character to the tungsten oxide layer.

The ribbon was cooled and cut into sheets. The optical properties of a sample sheet coated according to the respective examples were examined: luminous transmittance (TL), luminous reflectance from the coated face of the sheet (RLc), Hunter values a and b in both transmission and reflection and solar factor (FS). The selectivity (TUFS) was also noted. The results are shown in the accompanying table.

EXAMPLES 1 AND 2

Sample sheets of coated glass were prepared as described for Comparative Examples 1 to 3, but with the difference that undercoat layers of respectively stannic oxide ($SnO_2$) [Example 1] and titanium dioxide (TiO2) [Example 2] were applied to the ribbon prior to the $WO_3$ layer. The undercoat was applied by CVD pyrolysis using a coating unit, located upstream of the coating unit for the $WO_3$.

A precursor solution in anhydrous nitrogen gas at about 250° C. as a carrier gas was fed with the carrier gas through the nozzle. The precursors, respectively MBTC and titanium tetrachloride, reacted to create thicknesses of deposited oxide as shown in the accompanying table. The $WO_3$ layer was deposited starting from $WF_6$ and sodium vapour. After application of the $WO_3$ layer the ribbon was cooled and cut into sheets and its optical properties examined. The results are again shown in the accompanying table.

EXAMPLES 3 AND 4

Sample sheets of coated glass were prepared as described for Comparative Examples 1 to 3, but in this case with the difference that an overcoat layerwas applied to the doped $WO_3$ layer. The overcoat layer in Example 3 was titanium dioxide ($TiO_2$) and in Example 4 was stannic oxide ($SnO_2$). It was applied by CVD pyrolysis using a coating unit located downstream of the coating unit for the $WO_3$.

The precursors of the overcoat layer oxides, respectively titanium tetrachloride and MBTC, reacted with superheated steam to create thicknesses of layer deposited on the doped $WO_3$ as shown in the accompanying table. After application of the overcoat layer the ribbon was cooled and cut into sheets. Its optical properties are shown in the accompanying table.

EXAMPLES 5 TO 11

Sample sheets of coated glass were again prepared as described for Comparative Examples 1 to 3, but also including the application of both an undercoat layer as described in Examples 1 and 2 and an overcoat layer as described in Examples 3 and 4.

For examples 9 to 11, instead of $WO_3$ the metal oxides of the conductive layer were respectively molybdenum trioxide ($MoO_3$), niobium pentoxide ($Nb_2O_5$) and tantalum pentoxide ($Ta_2O_5$). For examples 10 and 11, instead of sodium the dopant for the conductive layers was fluorine introduced by means of hydrofluoric acid (HF) or hexafluoroethane ($C_2F_6$). The specific materials used, the thicknesses of the respective layers, the proportions of dopant in the conductive layers, and the optical properties of the product sheets are given in the table.

| | Undercoat | | Active layer | | Dopant | | Overcoat | | | |
|---|---|---|---|---|---|---|---|---|---|---|
| Ex. | Material | Thickns. (nm) | Material | Thickns. (nm) | Material | Proportn. (mol %) | Material | Thickns. (nm) | TL (%) | RLc (%) |
| C1 | | | $WO_3$ | 30 | Na | 94 | | | 73 | 16 |
| C2 | | | $WO_3$ | 40 | Na | 94 | | | 66 | 20 |
| C3 | | | $WO_3$ | 50 | Na | 94 | | | 59 | 25 |
| C4 | | | WO3 | 60 | Na | 94 | | | 53 | 29 |
| 1 | $TiO_2$ | 27 | $WO_3$ | 42 | Na | 94 | | | 63 | 29 |
| 2 | $SnO_2$ | 35 | $WO_3$ | 33 | Na | 94 | | | 69 | 23 |
| 3 | | | $WO_3$ | 82 | Na | 94 | $TiO_2$ | 26 | 45 | 29 |
| 4 | | | $WO_3$ | 66 | Na | 94 | $SnO_2$ | 36 | 54 | 24 |
| 5 | $TiO_2$ | 21 | $WO_3$ | 38 | Na | 94 | $TiO_2$ | 23 | 84 | 5 |
| 6 | $TiO_2$ | 29 | $WO_3$ | 84 | Na | 94 | $TiO_2$ | 55 | 43 | 32 |
| 7 | $SnO_2$ | 25 | $WO_3$ | 34 | Na | 94 | $SnO_2$ | 29 | 84 | 5 |
| 8 | $SnO_2$ | 40 | $WO_3$ | 78 | Na | 94 | $SnO_2$ | 17 | 47 | 32 |
| 9 | $SnO_2$ | 21 | $MoO_3$ | 33 | Na | 83 | $SnO_2$ | 31 | 81 | 17 |
| 10 | $SnO_2$ | 41 | $Nb_2O_5$ | 250 | F | 1.8 | $SnO_2$ | 18 | 51 | 25 |
| 11 | $SnO_2$ | 23 | $Ta_2O_3$ | 320 | F | 1.7 | $SnO_2$ | 28 | 82 | 16 |

| Ex. | a (trans) (Hunter) | b (trans) (Hunter) | a (refl.) (Hunter) | b (refl.) (Hunter) | FS (%) | Selectivity |
|---|---|---|---|---|---|---|
| C1 | −3 | −8 | 2 | 5 | 59 | 1.24 |
| C2 | −4 | −14 | 7 | 19 | 52 | 1.27 |
| C3 | −5 | −19 | 8 | 24 | 46 | 1.28 |
| C4 | −4 | −26 | 9 | 28 | 42 | 1.26 |
| 1 | −2 | −4 | 1 | 1 | 51 | 1.24 |
| 2 | −2 | −2 | 1 | 1 | 57 | 1.21 |
| 3 | −3 | −7 | 2 | −10 | 35 | 1.29 |
| 4 | −2 | −4 | 0 | −9 | 43 | 1.26 |
| 5 | −2 | −3 | 0 | −1 | 67 | 1.25 |
| 6 | −2 | −5 | 0 | −6 | 34 | 1.26 |
| 7 | −2 | −1 | 0 | 0 | 68 | 1.24 |
| 8 | −3 | −4 | 0 | −6 | 37 | 1.27 |
| 9 | −1 | −1.5 | 0 | 0 | 59 | 1.37 |
| 10 | −1 | −4 | 0 | −5 | 42 | 1.21 |
| 11 | 0 | −6 | 0 | 0 | 70 | 1.17 |

What is claimed is:

1. A transparent glass sheet carrying a coating of at least two pyrolytically-formed layers, the so-coated sheet having
a neutral or blue tint in transmission and in reflection,
a luminous transmittance (TL) which is in the range 30 to 85% and a selectivity of greater than 1
the at least two pyrolytically-formed layers comprising, in order from the glass sheet;
1) a conductive or semi-conductive layer having a thickness in the range 15 to 500 nm and formed of a material comprising a metal oxide containing a dopant in an amount of from 1 to 100 moles per 100 moles of the metal oxide, the said metal oxide being selected from one or more of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$); and
2) an overcoat layer having a thickness which is in the range 5 to 60 nm.

2. The coated sheet as claimed in claim 1, wherein the dopant is selected from hydrogen, lithium, sodium, potassium and fluorine.

3. The coated sheet as claimed in claim 1, wherein the quantity of dopant is in the range 5 to 100 moles per 100 moles of the metal oxide.

4. The coated sheet as claimed in claim 3, wherein the quantity of dopant is in the range 20 to 100 moles per 100 moles of the metal oxide.

5. The coated sheet as claimed in claim 2, wherein the conductive or semi-conductive layer is a conductive layer, wherein the dopant is selected from hydrogen, lithium, sodium and potassium and wherein the thickness of the conductive layer is in the range 15 to 100 nm.

6. The coated sheet as claimed in claim 2, wherein the conductive or semi-conductive layer is a semi-conductive layer, wherein the dopant is fluorine and wherein the thickness of the semi-conductive layer is in the range 100 to 500 nm.

7. The coated sheet as claimed in claim 1, wherein the coating further includes at least one transparent undercoat layer between the glass sheet and the conductive or semi-conductive layer.

8. The coated sheet as claimed in claim 7, wherein the material of the undercoat layer is selected from the group consisting of oxides, oxycarbides, nitrides, oxynitrides, $Al_2O_3$, $SiO_2$, SiOx (0<x<2), $SnO_2$, $SnO_2$/Sb (0.02<Sb/Sn<O.5), SnO2/F (0.01<F/Sn<0.03), $TiO_2$, $ZrO_2$, SiOxCy, AlN, Si3N4, AlNxOy, SiNxOy, and combinations of these materials.

9. The coated sheet as claimed in claim 7, wherein the material of the undercoat layer is an oxide.

10. The coated sheet as claimed in claim 7, wherein the material of the undercoat layer is a dielectric material.

11. The coated sheet as claimed in claim 7, wherein the thickness of the undercoat layer is in the range 15 to 90 nm.

12. The coated sheet as claimed in claim 1, wherein the material of the overcoat layer is selected from the group consisting of oxides, nitrides and oxynitrides, $Al_2O_3$, $SiO_2$, $SnO_2$, $SnO_2$/Sb (0.02<Sb/Sn<O.5), $SnO_2$/F (0.01<F/Sn<0.03), $TiO_2$, $ZrO_2$, Si3N4, SiNxOy and combinations of these materials.

13. The coated sheet as claimed in claim 1, wherein the material of the overcoat layer is an oxide.

14. The coated sheet as claimed in claim 1, wherein the material of the overcoat is a dielectric material.

15. The coated sheet as claimed in claim 1, wherein the coated sheet consists essentially of the transparent glass sheet, the conductive or semi-conductive layer and the overcoat.

16. The coated sheet as claimed in claim 15, wherein the thickness of the overcoat layer is in the range 10 to 60 nm.

17. The coated sheet as claimed in claim 7, wherein the thickness of the undercoat layer is in the range 15 to 60 nm.

18. The coated sheet as claimed in claim 7, wherein the coated sheet consists essentially of the transparent glass sheet, the undercoat, the conductive or semi-conductive layer and the overcoat.

19. The coated sheet as claimed in claim 1, wherein the selectivity is greater than 1.2.

20. A glazing panel comprising a coated transparent glass sheet as claimed in claim 1.

21. The glazing panel as claimed in claim 20, for use as a building glazing panel.

22. The glazing panel as claimed in claim 20, for use as a vehicle window.

23. A method of producing a transparent glass sheet carrying a coating of at least two pyrolytically-formed layers, the so-coated sheet having a neutral or blue tint in transmission and in reflection,
a luminous transmittance (TL) which is in the range 30 to 85% and a selectivity of greater than 1 comprising at least the following steps:
1) pyrolytically depositing a conductive or semi-conductive layer having a thickness in the range 15 to 500 nm and formed of a material comprising a metal oxide containing a dopant in an amount of from 1 to 100 moles per 100 moles of the metal oxide, the said metal oxide being selected from one or more of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$); and
2) subsequently pyrolytically depositing an overcoat layer having a thickness which is in the range 5 to 60 nm.

24. The method as claimed in claim 23, wherein the dopant is applied after formation of the metal oxide and allowed to diffuse into the metal oxide.

25. The method as claimed in claim 23, wherein the metal oxide is formed within the float chamber of a flat glass production line and the hydrogen to act as the dopant is provided by a hydrogen atmosphere in the said chamber.

26. The method as claimed in claim 23, wherein the coating is applied to newly-formed hot glass ribbon in or from a float glass production line.

27. The method as claimed in claim 23, wherein the respective coating layers are applied to the glass sheet by chemical velour deposition (CVD).

28. The method as claimed in claim 23, wherein the respective coating layers are applied to the glass sheet as a liquid spray.

29. The method as claimed in claim 23, wherein the respective coating layers are applied to the glass sheet by a combination of CVD and spray.

30. The method as claimed in claim 23, wherein the method comprises the additional step of pyrolytically depositing at least one transparent layer as an undercoat between the glass sheet and the conductive or semi-conductive layer.

31. A coated sheet consisting essentially of a transparent glass sheet carrying two pyrolytically-formed layers, the so-coated sheet having
a neutral or blue tint in transmission and in reflection,
a luminous transmittance (TL) which is in the range 30 to 85% and a selectivity of greater than 1 the two pyrolytically-formed layers comprising, in order from the glass:

1) at least one undercoat layer;
2) a conductive or semi-conductive layer having a thickness in the range 15 to 500 nm and formed of a material comprising a metal oxide containing a dopant in an amount of from 1 to 100 moles per 100 moles of the metal oxide, the said metal oxide being selected from one or more of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$).

32. The coated sheet as claimed in claim 31, wherein the material of the undercoat layer is selected from the group consisting of oxides, oxycarbides, nitrides, oxynitrides, such as $Al_2O_3$, $SiO_2$, SiOx (0<x<2), $SnO_2$, $SnO_2$/Sb (0.02<Sb/Sn<0.5), SnO2/F (0.01<F/Sn<0.03), $TiO_2$, $ZrO_2$, SiOxCy, AlN, Si3N4, AlNxOy, SiNxOy and combinations of these materials.

33. The coated sheet as claimed in claim 31, wherein the thickness of the undercoat layer is in the range 15 to 90 nm.

34. A transparent glass sheet carrying a coating of at least two pyrolytically-formed layers, the so-coated sheet having
 a neutral or blue tint in transmission and in reflection,
 a luminous transmittance (TL) which is in the range 30 to 85% and a selectivity of greater than 1 the at least two pyrolytically-formed layers comprising, in order from the glass sheet:
 1) a conductive or semi-conductive layer having a thickness in the range 15 to 500 nm and formed of a material comprising a metal oxide containing a dopant in an amount of from 1 to 100 moles per 100 moles of the metal oxide, the said metal oxide being selected from one or more of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$); and
 2) a non conductive overcoat layer.

35. The coated sheet as claimed in claim 34, wherein the non conductive overcoat layer has a thickness which is in the range 5 to 60 nm.

36. The coated sheet as claimed in claim 34, wherein the quantity of dopant is in the range 5 to 100 moles per 100 moles of the metal oxide.

37. The coated sheet as claimed in claim 34, wherein the quantity of dopant is in the range 20 to 100 moles per 100 moles of the metal oxide.

38. The coated sheet as claimed in claim 34, wherein the conductive or semi-conductive layer is a conductive layer, wherein the dopant is selected from hydrogen, lithium, sodium and potassium and wherein the thickness of the conductive layer is in the range 15 to 100 nm.

39. The coated sheet as claimed in claim 36, wherein the conductive or semi-conductive layer is a semi-conductive layer, wherein the dopant is fluorine and wherein the thickness of the semi-conductive layer is in the range 100 to 500 nm.

40. The coated sheet as claimed in claim 34, wherein the coating further includes at least one transparent undercoat layer between the glass sheet and the conductive or semi-conductive layer.

41. The coated sheet as claimed in claim 34, wherein the undercoat layer is non-conductive.

42. The coated sheet as claimed in claim 34, wherein the thickness of the undercoat layer is in the range 15 to 90 nm.

* * * * *